United States Patent
Suzuki et al.

(10) Patent No.: US 11,773,868 B2
(45) Date of Patent: Oct. 3, 2023

(54) BLOWER

(71) Applicant: DENSO CORPORATION, Kariya (JP)

(72) Inventors: Yoshihiro Suzuki, Kariya (JP); Hiroyuki Satoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 3 days.

(21) Appl. No.: 17/706,046

(22) Filed: Mar. 28, 2022

(65) Prior Publication Data

US 2022/0220974 A1 Jul. 14, 2022

Related U.S. Application Data

(63) Continuation of application No. PCT/JP2020/034498, filed on Sep. 11, 2020.

(30) Foreign Application Priority Data

Oct. 21, 2019 (JP) ................. 2019-192075

(51) Int. Cl.
- *F04D 29/44* (2006.01)
- *F04D 17/10* (2006.01)
- *F04D 29/42* (2006.01)
- *F04D 29/70* (2006.01)
- *F04D 5/00* (2006.01)

(52) U.S. Cl.
CPC ......... *F04D 29/4226* (2013.01); *F04D 5/007* (2013.01); *F04D 17/10* (2013.01); *F04D 17/105* (2013.01); *F04D 29/424* (2013.01); *F04D 29/4213* (2013.01); *F04D 29/4293* (2013.01); *F04D 29/441* (2013.01); *F04D 29/701* (2013.01); *F04D 29/703* (2013.01)

(58) Field of Classification Search
CPC .... F04D 5/007; F04D 29/4293; F04D 29/703; F04D 29/424; F04D 29/441; F04D 17/105; F04D 17/10
See application file for complete search history.

(56) References Cited

U.S. PATENT DOCUMENTS

2012/0318586 A1   12/2012   Atarashi

FOREIGN PATENT DOCUMENTS

| EP | 3530955 A1 | 8/2019 | |
| JP | 2018035791 | * 9/2016 | ............. F04D 29/44 |

(Continued)

*Primary Examiner* — Eldon T Brockman
*Assistant Examiner* — Andrew J Marien
(74) *Attorney, Agent, or Firm* — Harness, Dickey & Pierce, P.L.C.

(57) ABSTRACT

A blower includes a fluid introducing box, a fan, a casing, a tubular portion disposed inside the fan to introduce a first fluid and a second fluid separately into the fan, and an upper end portion defining an inlet into the tubular portion. The casing has a suction port forming portion defining a suction port. The upper end portion is disposed between the suction port forming portion and the fluid introducing box. A gap passage is defined between the upper end portion and the suction port forming portion. At least one of the first fluid or the second fluid is introduced into the gap passage from a passage inlet and fluids through the gap passage toward a downstream portion. A distance between the upper end portion and the suction port forming portion in the axial direction at the downstream portion is less than that at the passage inlet.

6 Claims, 10 Drawing Sheets

(56) References Cited

FOREIGN PATENT DOCUMENTS

| JP | 2018091274 | * | 12/2016 | ............ | F04D 29/44 |
| JP | 2018178830 | * | 4/2017 | ............ | F04D 29/08 |
| JP | 2020139419 | * | 2/2019 | ............ | F04D 29/44 |
| WO | WO-2011108403 A1 | | 9/2011 | | |

* cited by examiner

US 11,773,868 B2

BLOWER

CROSS-REFERENCE TO RELATED APPLICATIONS

The present application is a continuation application of International Patent Application No. PCT/JP2020/034498 filed on Sep. 11, 2020, which designated the U.S. and claims the benefit of priority from Japanese Patent Application No. 2019-192075 filed on Oct. 21, 2019. The entire disclosures of all of the above applications are incorporated herein by reference.

TECHNICAL FIELD

The present disclosure relates to a blower.

BACKGROUND ART

Conventionally, a one-sided suction type centrifugal blower is known, which capable of sucking simultaneously air inside a cabin and air outside the cabin separately from each other. In this type of centrifugal blower, a ventilation passage radially outside of an impeller is divided in an axial direction of the impeller by a partition into an upper passage and a lower passage. A separation tube is provided inside the impeller to separate the air taken in from the outside into the upper passage and the lower passage.

SUMMARY

According to one aspect of the present disclosure, the blower is configured to suck a first fluid and a second fluid separately at a same time. The blower includes a fluid introducing box, a fan, a casing, a tubular portion, and an upper end portion. The fluid introducing box defines a first inlet through which the first fluid is introduced and a second inlet through which the second fluid is introduced. The fan is configured to suck at least one of the first fluid or the second fluid in an axial direction of the fan and blow the at least one of the first fluid or the second fluid in a radial direction of the fan by rotating about a fan axis. The casing houses the fan. The tubular portion has a part disposed inside the fan and configured to introduce at least one of the first fluid or the second fluid separately into the fan. The upper end portion is connected to one end of the tubular portion in the axial direction and defines an air inlet for introducing at least one of the first fluid or the second fluid into the tubular portion. The casing has a suction port forming portion at one end of the casing in the axial direction and the suction port forming portion defines a suction port for introducing at least one of the first fluid or the second fluid into the fan. The upper end portion is disposed at a position between the suction port forming portion and the fluid introducing box to overlap with both of a part of the suction port and a part of the suction port forming portion in the axial direction. A gap passage is defined between the upper end portion and the suction port forming portion and the gap passage includes a passage inlet. At least one of the first fluid or the second fluid is introduced into the gap passage from the passage inlet and fluids through the gap passage toward a downstream portion of the gap passage that is away from the passage inlet. A distance between the upper end portion and the suction port forming portion in the axial direction at the downstream portion is less than that at the passage inlet.

DESCRIPTION OF EMBODIMENTS

Figure 1:
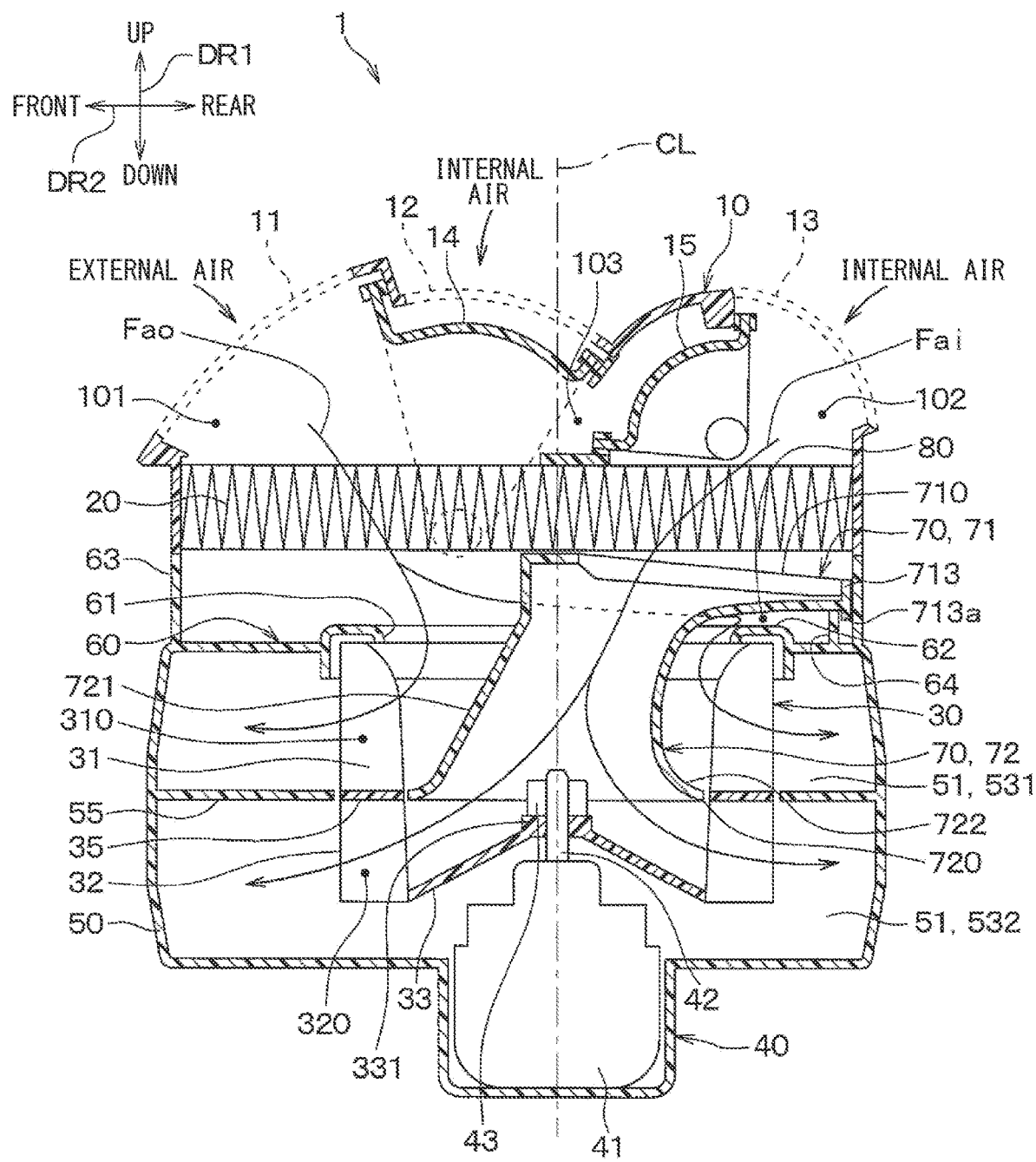
FIG. 1 is a schematic cross-sectional view of a blower according to a first embodiment.

To begin with, examples of relevant techniques will be described.

Conventionally, a one-sided suction type centrifugal blower is known, which capable of sucking simultaneously air inside a cabin (hereinafter, also referred to as internal air) and air outside the cabin (hereinafter, also referred to as external air) separately from each other. In this type of centrifugal blower, a ventilation passage radially outside of an impeller is divided in an axial direction of the impeller by a partition into an upper passage and a lower passage. A separation tube is provided inside the impeller to separate the air taken in from the outside into the upper passage and the lower passage. The separation tube has a plate-shaped upper end portion that defines an air inlet. The upper end portion has a substantially rectangular cross-section. With this configuration, a part of the air from the outside flows into the separation tube through the air inlet of the upper end portion and flows through the impeller into the lower passage. Further, the rest of the air from the outside flows outside of the separation tube without passing through the air inlet of the upper end portion and flows through the impeller into the upper passage. As described above, the centrifugal blower is configured to blow air sucked from one side of the impeller in the axial direction of the impeller separately into the upper passage and the lower passage.

By the way, the centrifugal blower includes a casing housing the impeller and the casing has a suction port forming portion defining a suction port for air. A part of the suction port forming portion is covered with the upper end portion. When a part of the suction port forming portion is covered with the upper end portion as described above, a part of air flowing outside of the separation tube flows into a gap passage defined between the upper end portion and the suction port forming portion, and then is sucked into the impeller through the suction port. At this time, the air flowing into the gap passage is gradually sucked into the suction port, thus, a downstream portion of the gap passage that is away from the passage inlet has a region where there is almost no airflow. As a result, a stagnation of airflow is generated in the region. Thus, the pressure loss in the gap passage becomes large, and air suction efficiency of the blower deteriorates. These matters are found by diligent studies by the present inventors.

It is an objective of the present disclosure to provide a blower that can suck air efficiently.

According to one aspect of the present disclosure, the blower is configured to suck a first fluid and a second fluid separately at a same time. The blower includes a fluid introducing box, a fan, a casing, a tubular portion, and an upper end portion. The fluid introducing box defines a first inlet through which the first fluid is introduced and a second inlet through which the second fluid is introduced. The fan is configured to suck at least one of the first fluid or the second fluid in an axial direction of the fan and blow the at least one of the first fluid or the second fluid in a radial direction of the fan by rotating about a fan axis. The casing houses the fan. The tubular portion has a part disposed inside the fan and configured to introduce at least one of the first fluid or the second fluid separately into the fan. The upper end portion is connected to one end of the tubular portion in the axial direction and defines an air inlet for introducing at least one of the first fluid or the second fluid into the tubular portion. The casing has a suction port forming portion at one end of the casing in the axial direction and the suction port forming portion defines a suction port for introducing at least one of the first fluid or the second fluid into the fan. The upper end portion is disposed at a position between the suction port forming portion and the fluid introducing box to overlap with both of a part of the suction port and a part of the suction port forming portion in the axial direction. A gap passage is defined between the upper end portion and the suction port forming portion and the gap passage includes a passage inlet. At least one of the first fluid or the second fluid is introduced into the gap passage from the passage inlet and fluids through the gap passage toward a downstream portion of the gap passage that is away from the passage inlet. A distance between the upper end portion and the suction port forming portion in the axial direction at the downstream portion is less than that at the passage inlet.

As described above, when the distance between the upper end portion and the suction port forming portion in the axial direction at the downstream portion is less than that at the passage inlet, a useless area where there is almost no airflow is less likely to occur in the downstream portion. Further, the upper end portion serves as a guide that guides the air toward the suction port in the gap passage.

Therefore, according to the blower of the present disclosure, it is possible to suck air more efficiently than the conventional blower.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The following embodiments may be partially combined with each other unless such combination causes a disadvantage, even if it is not explicitly described.

First Embodiment

The present embodiment will be described with reference to FIGS. 1 to 9. In the present embodiment, an example in which a blower 1 of the present disclosure is applied to a two-layer internal/external air conditioner for a vehicle will be described. The blower 1 is arranged inside an instrument panel at the front part of a vehicle compartment.

As shown in FIG. 1, the blower 1 includes an internal-external air box 10, a filter 20, a fan 30, an electric motor 40, a scroll casing 50, and a separation tube 70. The arrows indicating up/down, front/rear, and left/right in each drawing indicate the up-down direction DR1, the front-rear direction DR2, and the right-left direction DR3 when the blower 1 is mounted on the vehicle.

The internal-external air box 10 is arranged in an upper portion of the blower 1. The upper surface of the internal-external air box 10 defines an external air introducing port 11 for introducing external air, a first internal air introducing port 12 for introducing internal air, and a second internal air introducing port 13 for introducing internal air in order from the front side in the front-rear direction DR2. With such configuration, external air is easily introduced into the internal-external air box 10 from the outside of the vehicle compartment and internal air is easily introduced into the internal-external air box 10 from the inside of the vehicle compartment.

The internal-external air box 10 defines, therein, a first introducing space 101 into which external air from the external air introducing port 11 or internal air from the first internal air introducing port 12 is introduced and a second introducing space 102 into which internal air from the second internal air introducing port 13 is introduced. The first introducing space 101 and the second introducing space 102 are in fluid communication with each other through a communication passage 103.

Inside the internal-external air box 10, a first internal-external door 14 and a second internal-external door 15 is arranged. The first internal-external door 14 is configured to selectively open and close the external air introducing port 11 and the first internal air introducing port 12. The second internal-external door 15 is configured to selectively open and close the second internal air introducing port 13 and the communication passage 103. Each of the first internal-external door 14 and the second internal-external door 15 is configured as a rotary door. The first internal-external door 14 and the second internal-external door 15 may be configured as a door other than the rotary door. The internal-external air box 10 enables the blower 1 to separately suck internal air and external air at the same time.

In the present embodiment, the external air introducing port 11 corresponds to a first introducing port through which external air as a first fluid is introduced, and the first internal air introducing port 12 and the second internal air introducing port 13 correspond a second introducing port through which internal air as a second fluid is introduced. Further, in the present embodiment, the internal-external air box 10 corresponds to a fluid introducing box.

The filter 20 is arranged below the internal-external air box 10. The filter 20 is arranged to be substantially parallel to the horizontal direction (for example, the front-rear direction DR2). The filter 20 filters the air introduced from the internal-external air box 10 and collects foreign matters.

Each of the internal-external air box 10 and the filter 20 has a rectangular shape in a top view.

The fan 30 is a centrifugal fan that sucks air from one side of the blower 1 in an axial direction of the fan 30 and blows out the sucked air in a radial direction away from the fan axis CL of the fan 30, which is a rotational axis. The fan 30 is formed of a sirocco fan. The fan 30 is not limited to a sirocco fan and may be formed of a radial fan or a turbofan.

Here, the axial direction of the fan 30 is a direction extending along the fan axis CL. Further, the radial direction of the fan 30 is perpendicular to the fan axis CL and extends radially about the fan axis CL. The blower 1 of the present embodiment is arranged so that the axial direction of the fan 30 is substantially parallel to the up-down direction DR1. Hereinafter, the axial direction of the fan 30 is referred to as a fan axial direction, and the radial direction of the fan 30 is referred to as a fan radial direction.

The fan 30 has a plurality of first blades 31, a plurality of second blades 32, a main plate 33, and a separation plate 35. The first blades 31 are arranged around the fan axis CL. Between the first blades 31, first blade passages 310 through which air flows are defined.

The second blades 32 are arranged around the fan axis CL. The second blades 32 are disposed on a side of the first blades 31 opposite to the internal-external air box 10 in the fan axial direction. Between the second blades 32, second blade passages 320 through which air flows are defined.

The main plate 33 is formed of a disk-shaped member and its center is on the fan axis CL. The main plate 33 includes, in the center thereof, a boss 331 to which a shaft 42 of the electric motor 40 is connected not to rotate relative to each other. The lower end portions of the second blades 32 are fixed to the outer portion of the main plate 33 in the radial direction of the fan 30.

The separation plate 35 is a member that connects between the first blades 31 and the second blades 32. The separation plate 35 inhibits air flowing through the first blade passages 310 between the first blades 31 from being mixed with air flowing through the second blade passages 320 between the second blades 32. The separation plate 35 has a ring shape about the fan axis CL, and is formed of a plate-shaped member whose plate surface extends to intersect the fan axis CL. The lower end portions of the first blades 31 are fixed to a first plate surface of the separation plate 35, and the upper end portions of the second blades 32 are fixed to a second plate surface of the separation plate 35. The first plate surface and the second plate surface face in the fan axial direction.

The fan 30 configured in this way is formed as an integrally molded product in which the first blades 31, the second blades 32, the main plate 33, and the separation plate 35 are integrally molded by a molding technique such as injection molding.

The electric motor 40 is configured to rotate the fan 30. The electric motor 40 has a main body 41 that generates power for rotating the fan 30, and the shaft 42 that is rotated by the power of the main body 41.

The shaft 42 extends from the main body 41 toward one side in the fan axial direction. The shaft 42 is fixed to the main plate 33 of the fan 30 by a motor cap 43. As a result, when the shaft 42 rotates, the fan 30 rotates.

The scroll casing 50 is a casing housing the fan 30. The scroll casing 50 rectifies the airflow blown out radially outward from the fan 30 into a flow in the circumferential direction of the fan 30. The scroll casing 50 forms a spiral ventilation passage 51 on the outer side of the fan 30 in the radial direction.

Figure 2:
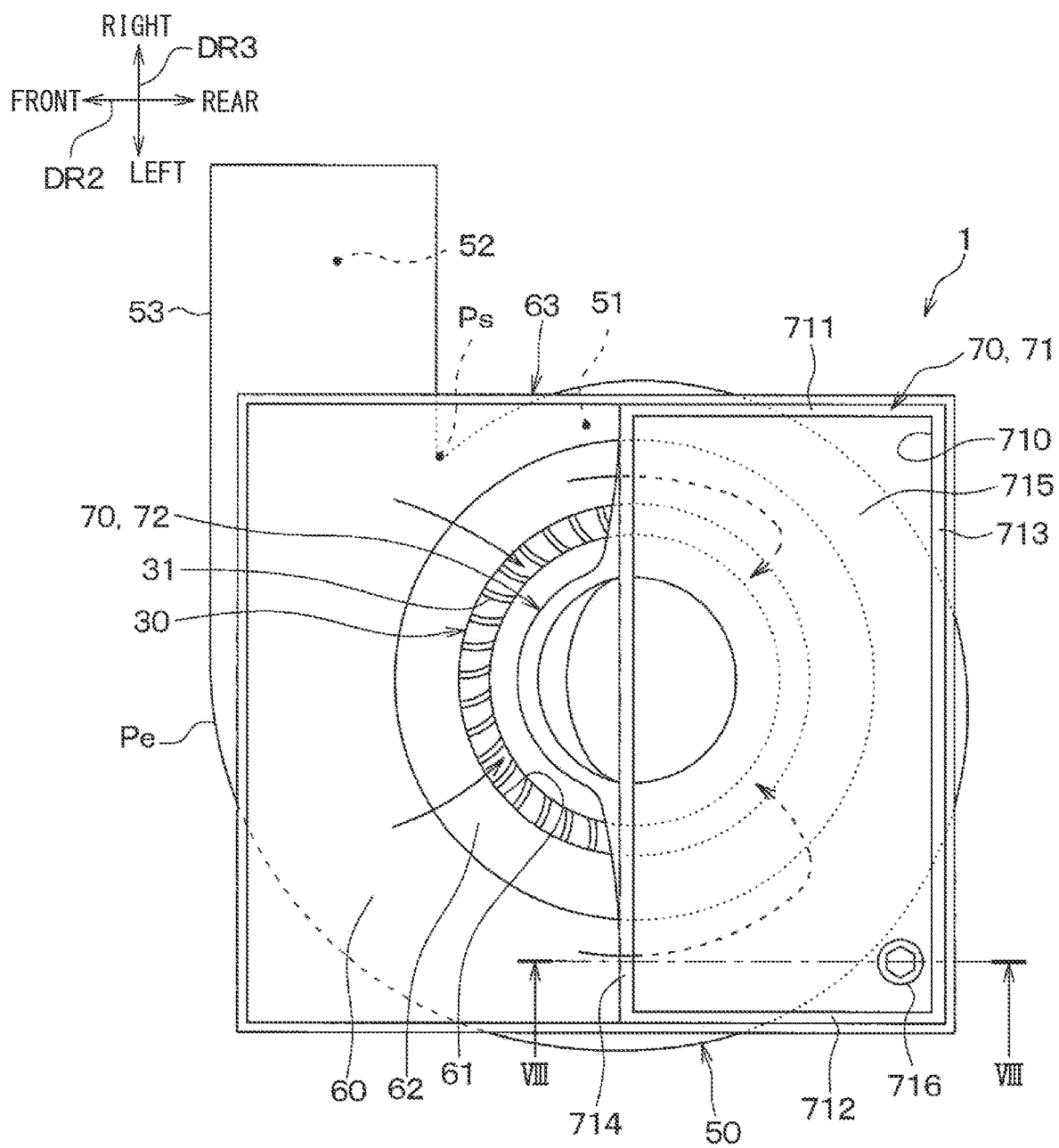
FIG. 2 is a schematic plan view illustrating a part of the blower according to the first embodiment.

As shown in FIG. 2, the scroll casing 50 has a nose portion Ps and an end portion Pe. A scroll diameter rs that is a distance between the fan axis CL and an outer circumferential wall of the scroll casing 50 is minimum at the nose portion Ps and maximum at the end portion Pe. The nose portion Ps is a start point of the ventilation passage 51 and a passage area of the ventilation passage 51 is minimum at the nose portion Ps. The end portion Pe is an end point of the ventilation passage 51 and the passage area of the ventilation passage 51 is maximum at the end portion Pe.

An outlet passage portion 53 defining a discharge passage 52 for discharging air toward an air conditioner unit of a vehicular air conditioner (not shown) is fluidly connected to the end portion Pe. As a result, the air flowing inside the scroll casing 50 is introduced into the air conditioning unit.

Although not shown, the air conditioning unit adjusts the air introduced from the blower 1 to a desired temperature and blows it into the vehicle compartment. The air conditioning unit is configured to adjust the air introduced from the blower 1 to a desired temperature with a heat exchanger such as an evaporator or a heater core.

Referring back to FIG. 1, the scroll casing 50 includes a suction port forming portion 60 in an upper portion of the scroll casing 50 that is on one side of the fan 30 in the fan axial direction. The suction port forming portion 60 forms an upper end surface of the scroll casing 50. The suction port forming portion 60 defines, at its substantially central area, a suction port 61 through which air is sucked into the fan 30.

The suction port forming portion 60 has a bell mouth 62 at an edge of the suction port 61. The bell mouth 62 guides the air into the suction port 61. The bell mouth 62 has an arc-shaped cross-section such that the air smoothly flows into the suction port 61. As a result, the air that has passed through the filter 20 is sucked into the fan 30 through the bell mouth 62.

To the suction port forming portion 60, an attachment frame 63 for connecting the internal-external air box 10 and the filter 20 are attached. The internal-external air box 10 and the filter 20 are attached to the attachment frame 63.

Inside the scroll casing 50, a partition 55 for partitioning the ventilation passage 51 and the discharge passage 52 in the up-down direction into a first ventilation passage 531 and a second ventilation passage 532. The partition 55 is arranged at a position corresponding to the separation plate 35 of the fan 30. The partition 55 is, for example, arranged to overlap with the separation plate 35 in the radial direction of the fan 30. As a result, the air having passed through the first blade passages 310 flows into the first ventilation passage 531. Further, the air having passed through the second blade passages 320 flows into the second ventilation passage 532.

The separation tube 70 is a tubular member extending in the fan axial direction. The separation tube 70 is open at both ends in the fan axial direction. The air to pass through the suction port 61 is divided by the separation tube 70 into an inside air flowing inside of the separation tube 70 and an outside air flowing outside of the separation tube 70.

The separation tube 70 has a tubular portion 72 having a part disposed inside the fan 30 and an upper end portion 71 disposed on one side of the tubular portion 72 in the fan axial direction. The upper end portion 71 and the tubular portion 72 are configured as an integrally molded product.

The upper end portion 71 defines an air inlet 710 for introducing air into the tubular portion 72. The air inlet 710 opens below the second introducing space 102 of the internal-external air box 10 so that the air having been introduced into the second introducing space 102 of the internal-external air box 10 flows into the air inlet 710.

The upper end portion 71 is arranged at a position between the suction port forming portion 60 and the internal-external air box 10 to overlap with both of a part of the suction port 61 and a part of the suction port forming portion 60. The upper end portion 71 covers a substantially half of each of the suction port 61 and the bell mouth 62. Specifically, the upper end portion 71 covers an overlapping part of the suction port 61 with the second introducing space 102 in the up-down direction DR1 and an overlapping part of the bell mouth 62 with the second introducing space 102 in the up-down direction DR1.

Figure 3:
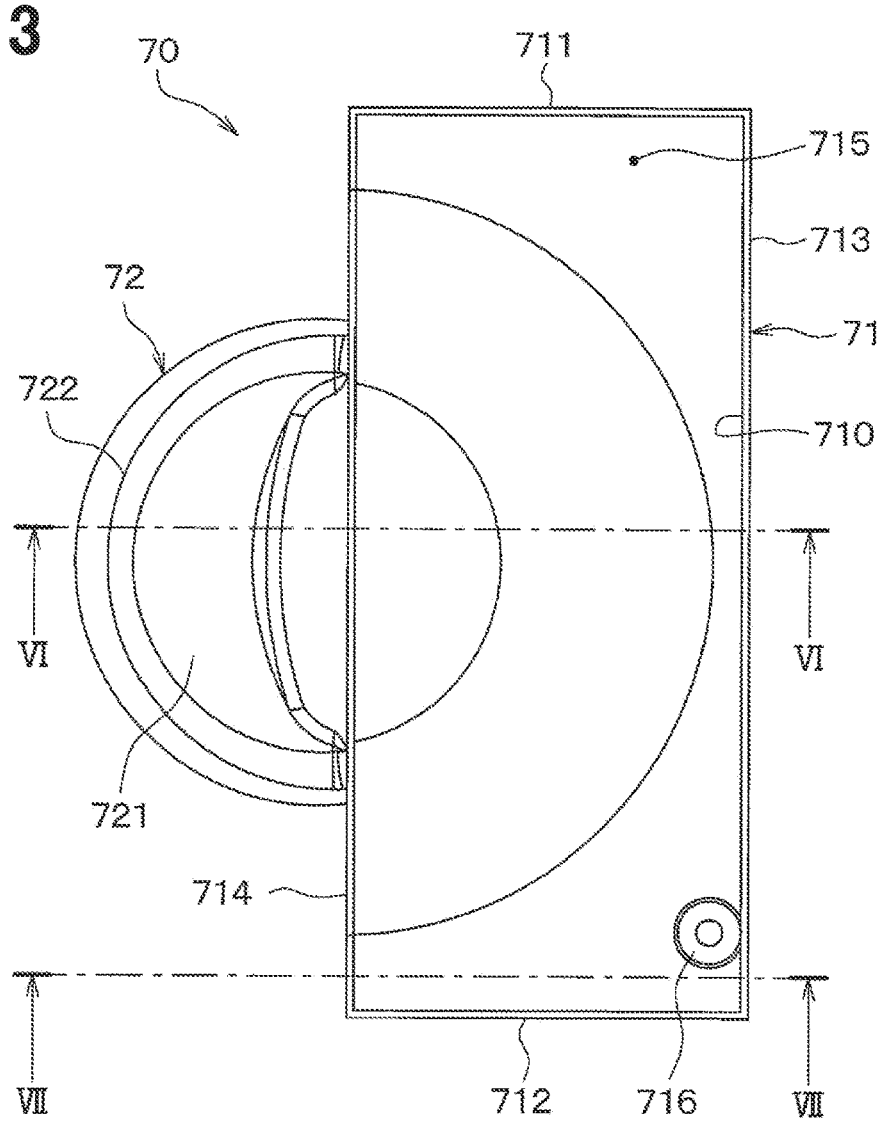
FIG. 3 is a schematic plan view of a separation tube of the blower according to the first embodiment.
Figure 4:
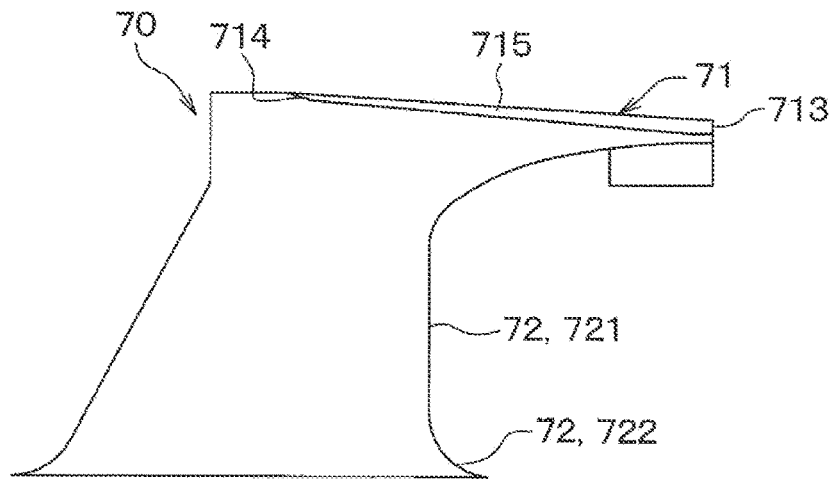
FIG. 4 is a schematic side view of the separation tube according to the first embodiment.

As shown in FIG. 3, the upper end portion 71 has a substantially rectangular outer shape when viewed from one side of the fan 30 in the fan axial direction. Further, as shown in FIG. 4, at least a part of the upper end portion 71 has a plate shape such that an outer shape of the upper end portion 71 viewed in the radial direction of the fan 30 has a thickness in the fan axial direction.

The upper end portion 71 has three edge portions 711, 712, 713 in contact with the attachment frame 63 of the suction port forming portion 60, and an outer edge portion 714 that overlaps with the suction port 61 in the fan axial direction. The outer edge portion 714 is not in contact with the attachment frame 63.

The tubular portion 72 is connected to the upper end portion 71. The tubular portion 72 includes an upper portion 721 connected to the upper end portion 71 and a lower portion 722 disposed inside the scroll casing 50. The upper portion 721 and the lower portion are tilted relative to the fan axial direction.

The tubular portion 72 is tilted relative to the fan axial direction so that an axis at a lower end portion of the upper portion 721 that is connected to the upper end portion 71 intersects the fan axis CL. Further, the lower portion 722 of the tubular portion 72 extends in the radial direction in a direction away from the tubular portion 72. At the lower end of the lower portion 722, an air outlet 720 through which the air flows out of the separation tube 70 is defined.

The lower end of the lower portion 722 is arranged at a position corresponding to the separation plate 35 of the fan 30. The lower end of the lower portion 722 is arranged, for example, to overlap with the separation plate 35 in the radial direction of the fan 30. As a result, the inside air flowing inside of the separation tube 70 flows into the second blade passages 320 of the fan 30. Further, the outside air flowing outside of the separation tube 70 flows into the first blade passages 310 of the fan 30.

The separation tube 70 is configured such that the air inlet 710 and the air outlet 720 partially overlap each other in the fan axial direction. Specifically, the separation tube 70 has a shape so that at least a part of the outer edges of the air inlet 710 can be visually recognized when the separation tube 70 is viewed from the air outlet 720.

Figure 5:
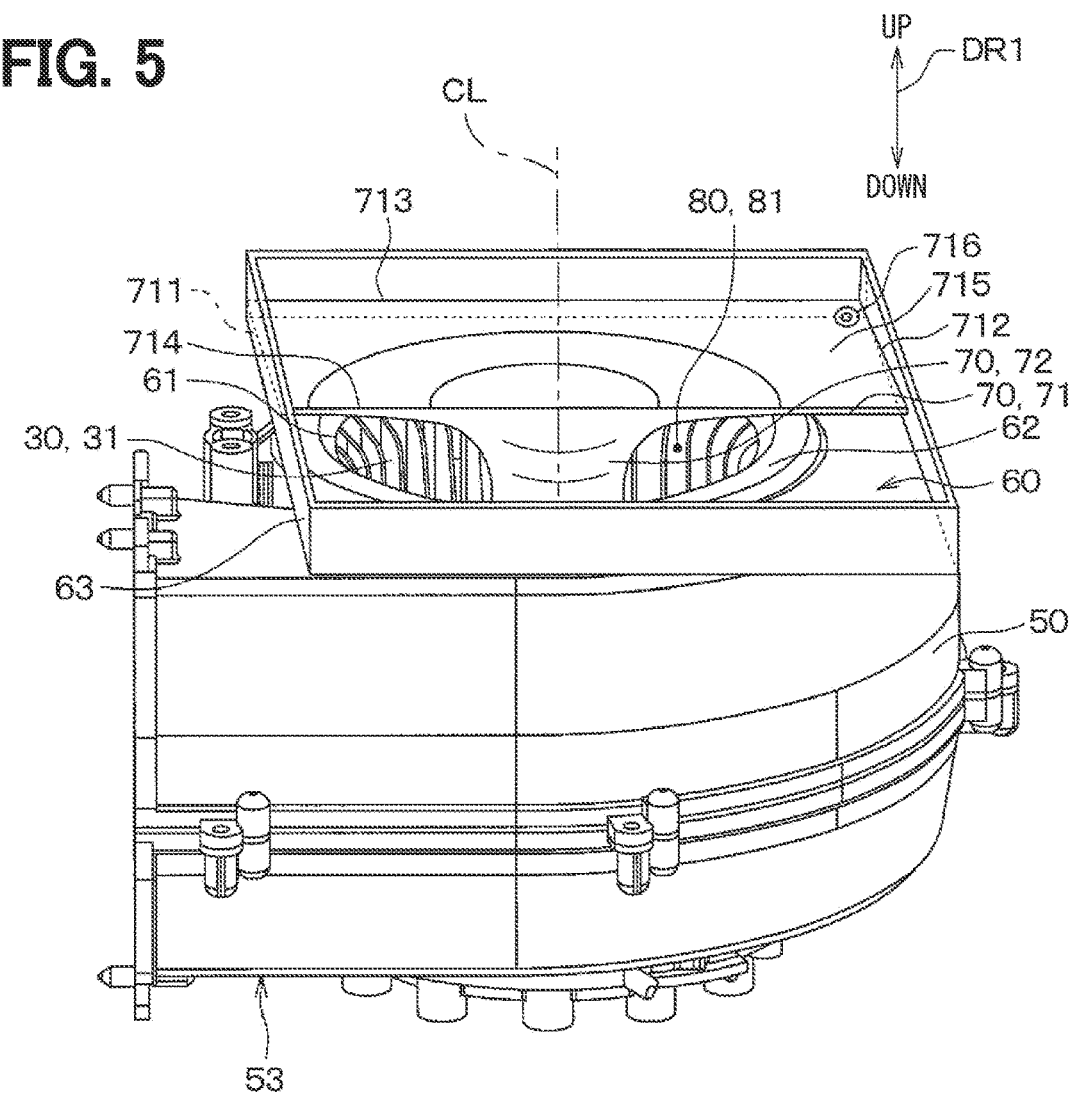
FIG. 5 is a schematic perspective view illustrating a part of the blower according to the first embodiment.

Here, as shown in FIG. 5, a gap passage 80 is defined between the upper end portion 71 and the suction port forming portion 60. The gap passage 80 is a space defined by the suction port forming portion 60, the attachment frame 63, and the upper end portion 71. A part of the outside air to pass through the outside of the separation tube 70 flows into the gap passage 80. In the gap passage 80, air flows from the outer edge portion 714 toward the edge portion 713 that faces the edge portion 714 of the upper end portion 71. Therefore, the outer edge portion 714 of the upper end portion 71 defines a passage inlet 81 of the gap passage 80.

The edge portion 713 facing the outer edge portion 714 defines a downstream portion of the gap passage 80.

The air that has flowed into the gap passage 80 is gradually sucked into the fan 30 through the suction port 61. At this time, at the downstream portion of the gap passage 80 that is away from the passage inlet 81, there is a region with almost no airflow, and stagnation of airflow is likely to generate in this region. Such stagnation of airflow is not preferable because it causes loss.

On the other hand, in the blower 1 of the present embodiment, the distance between the upper end portion 71 and the suction port forming portion 60 in the fan axial direction of the fan 30 at the downstream portion is less than that at the passage inlet 81.

Figure 6:
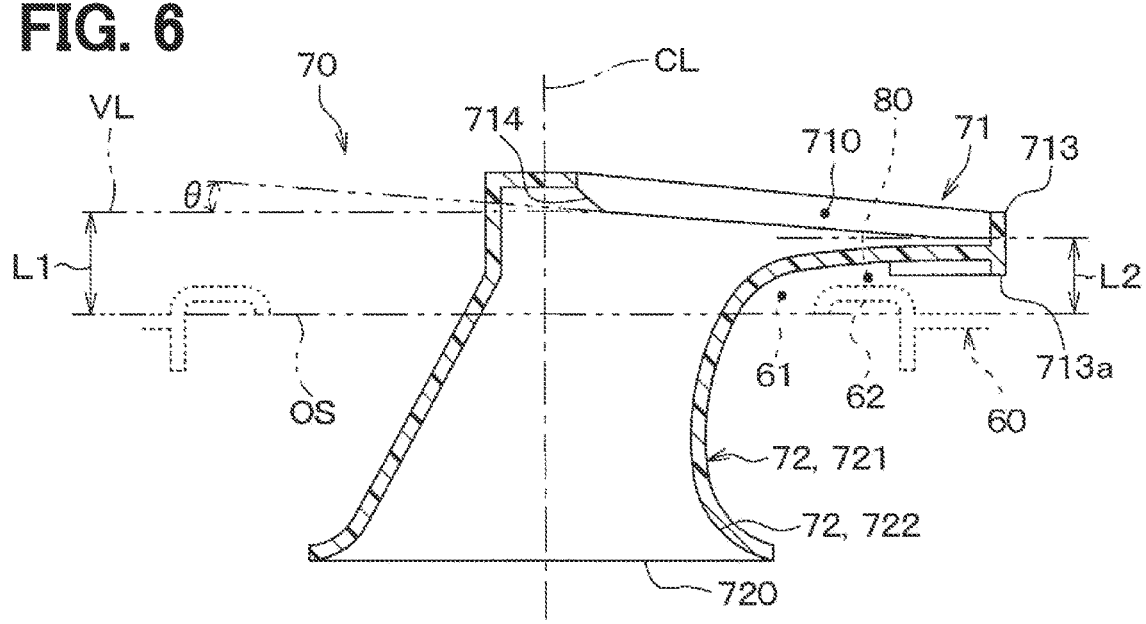
FIG. 6 is a cross-sectional view taken along a line VI-VI of FIG. 3.
Figure 7:
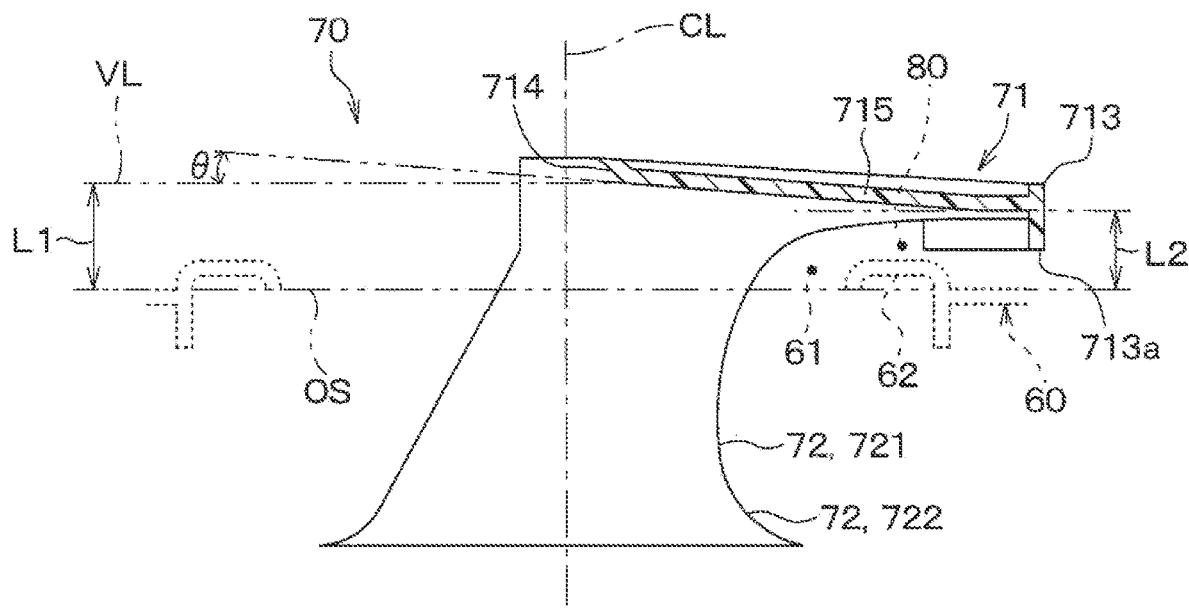
FIG. 7 is a cross-sectional view taken along a line VII-VII of FIG. 3.

FIGS. 6 and 7 are views illustrating the cross-sectional shape of the separation tube 70. In these figures, the suction port forming portion 60 is illustrated in a dashed line to clearly show a relationship between the upper end portion 71 and the suction port forming portion 60. As shown in FIGS. 6 and 7, the distance L2 between the upper end portion 71 and the suction port forming portion 60 at the edge portion 713 of the upper end portion 71 that faces the outer edge portion 714 is less than the distance L1 between the upper end portion 71 and the suction port forming portion 60 at the outer edge portion 714 of the upper end portion 71.

The upper end portion 71 of the present embodiment includes a flat plate portion 715 facing the suction port forming portion 60. The flat plate portion 715 has a thickness in the fan axial direction of the fan 30. The upper end portion 71 is arranged so that the plate surface of the plate portion 715 is tilted relative to the opening surface OS of the suction port 61. The opening surface OS is a virtual surface surrounded by and defined by the outer edge of the suction port 61. The opening surface OS of the present embodiment is perpendicular to the fan axis CL and is substantially parallel to the virtual line VL perpendicular to the fan axis CL.

Specifically, the upper end portion 71 is arranged such that a tilted angle θ between the plate surface of the plate portion 715 and the virtual line VL perpendicular to the fan axis CL is an acute angle. It is desirable that the tilted angle θ is set within a range that is larger than 0° and smaller than 45°, for example. More specifically, it is desirable that the tilted angle θ is set within a range of, for example, 5° to 20°.

As described above, the distance between the upper end portion 71 and the suction port forming portion 60 at the edge portion 713 is less than that at the outer edge portion 714. However, the distance is substantially constant from one of the edge portions 711, 712 to the other of the edge portions of the upper end portion 71. That is, the plate portion 715 of the upper end portion 71 is not tilted relative to the suction port forming portion 60 in the direction from one of the edge portions 711 and 712 toward the other.

Further, a seal structure is provided on the edge portion 713 of the upper end portion 71 to suppress air leakage from the upper end portion 71 to the suction port forming portion 60. This seal structure is realized by labyrinth gaps formed by a protrusion 713a protruding from the edge portion 713 of the upper end portion 71 toward the suction port forming portion 60 and a protrusion 64 protruding from the suction port forming portion 60 toward the upper end portion 71. The protrusion 713a of the upper end portion 71 is located radially outward of the protrusion 64 of the suction port forming portion 60. The seal structure is not limited to the labyrinth gaps, and may be realized by a fitting structure. Further, the seal structure may be realized by a structure in which the protrusion 713a of the upper end portion 71 is abutted against the suction port forming portion 60 or a structure in which the protrusion 64 of the suction port forming portion 60 is abutted against the upper end portion 71.

Figure 8:
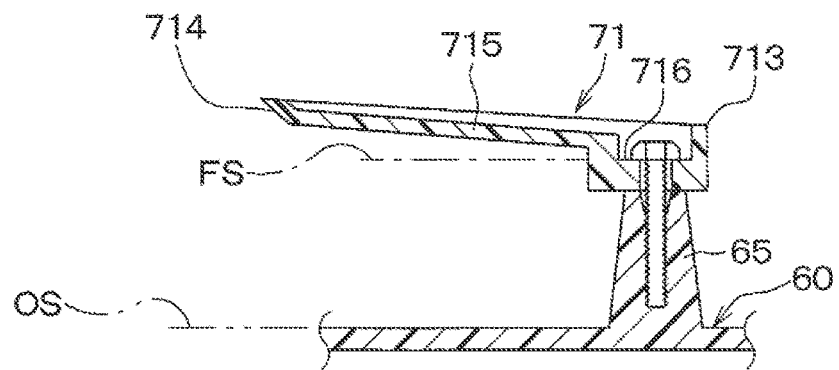
FIG. 8 is a cross-sectional view taken along a line VIII-VIII of FIG. 2.

FIG. 8 is a cross-sectional view taken along a line VIII-VIII of FIG. 2. As shown in FIG. 8, the suction port forming portion 60 has a supporter 65 at an outer side of the bell mouth 62 in the radial direction of the fan 30. The supporter 65 supports the upper end portion 71. The supporter 65 protrudes from the plate surface of the suction port forming portion 60 toward the upper end portion 71. The size of the supporter 65 is set such that the supporter 65 is in contact with the upper end portion 71 in the fan axial direction. The outer shape of the supporter 65 is a truncated cone shape and an end surface of the supporter 65 in contact with the upper end portion 71 is flat.

The upper end portion 71 has a supported portion 716 at a position facing the supporter 65. The supported portion 716 has a flat shape in which the angle defined between the supported portion 716 and the opening surface OC of the suction port 61 is smaller than the angle defined between other portion of the upper end portion 71 and the opening surface OS. Specifically, the supported portion 716 has a flat surface FS that is substantially parallel to the opening surface OS of the suction port 61.

Figure 9:
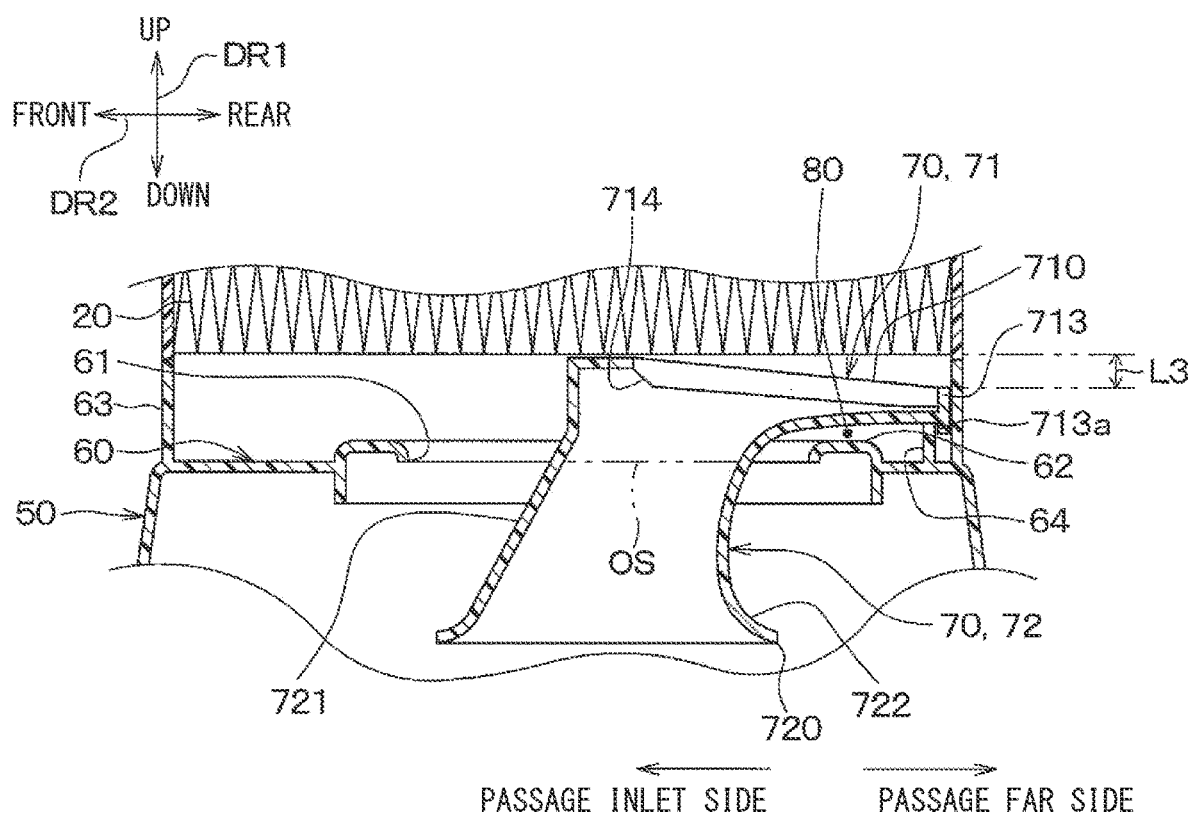
FIG. 9 is a diagram for explaining a relationship between a filter, an upper end portion, and a suction port of the blower according to the first embodiment.

As shown in FIG. 9, the distance between the upper end portion 71 and the filter 20 in the fan axial direction increases in a direction away from the passage inlet 81. That is, the distance L3 between the filter 20 and the upper end portion 71 in the fan axial direction at the edge portion 713 is greater than that at the outer edge portion 714 of the upper end portion 71.

In contrast, the distance between the opening surface OS of the suction port 61 of the suction port forming portion 60 and the filter 20 is constant. That is, the suction port forming portion 60 is arranged such that the opening surface OS of the suction port 61 is substantially parallel to the filter 20.

The blower 1 configured as described above can be selectively set, as an air suction mode, in an external air mode for introducing external air, an internal air mode for introducing internal air, and an internal-external air mode for separately introducing the external air and the internal air at the same time.

The external air mode is a mode for introducing only external air into the internal-external air box 10. During the external air mode, the blower 1 is controlled to position the first internal-external door 14 at a position opening the external air introducing port 11 and the second internal-external door 15 at a position opening the communication passage.

The internal air mode is a mode for introducing only internal air into the internal-external air box 10. During the internal air mode, the blower 1 is controlled to position the first internal-external door 14 at a position opening the first internal air introducing port 12 and the second internal-external door 15 at a position opening the second internal air introducing port 13.

The internal-external air mode is a mode for introducing both of internal air and external air into the internal-external air box 10. During the internal-external air mode, the blower 1 is controlled to position the first internal-external door 14 at a position opening the external air introducing port 11 and the second internal-external door 15 at a position opening the second internal air introducing port 13.

In the blower 1 during the internal-external air mode, when the fan 30 is rotated by the electric motor 40, external air is introduced into the first introducing space 101 through the external air introducing port 11 and internal air is introduced into the second introducing space 102 through the second internal air introducing port 13.

The external air introduced into the first introducing space 101 flows through an area of the filter 20 that is not overlap with the upper end portion 71 in the fan axial direction as shown in a solid line Fao, and then flows outside of the separation tube 70 and is sucked into the first blade passages 310 of the fan 30. The external air sucked into the first blade passages 310 is blown toward the first ventilation passage 531.

On the other hand, internal air introduced into the second introducing space 102 flows through the separation tube 70 and is sucked into the second blade passages 320 of the fan 30 as shown in arrows Fai. The internal air sucked into the second blade passages 320 is blown toward the second ventilation passage 532.

Although not shown, the external air flowing through the first ventilation passage 531 and the internal air flowing through the second ventilation passage 532 are introduced into the air-conditioning unit from the scroll casing 50. The temperatures of the external air and the internal air are adjusted respectively to desired values, and then the external air and the internal air are blown toward the vehicle compartment through different outlets.

Here, a part of the external air having passed through the filter 20 flows into the gap passage 80 defined between the upper end portion 71 and the suction port forming portion 60. In the blower 1 of the present embodiment, the distance between the upper end portion 71 and the suction port forming portion 60 in the fan axial direction is less at the downstream portion compared to at the passage inlet 81. Therefore, a useless region where there is almost no airflow is less likely to occur in the downstream portion.

In addition, the air flowing into the gap passage 80 from the passage inlet 81 is guided toward the suction port 61 by the upper end portion 71 when flowing toward the downstream portion of the gap passage 80. That is, the upper end portion 71 also serves as a guide that guides the air toward the suction port 61 in the gap passage 80. Therefore, according to the blower 1 of the present embodiment, it is possible to suck air more efficiently than the conventional one.

Specifically, the upper end portion 71 has the plate portion 715 that faces the suction port forming portion 60 and that has a thickness in the fan axial direction. The upper end portion 71 is arranged such that the plate surface of the plate portion 715 is tilted relative to the opening surface OS of the suction port 61. According to this, the distance between the upper end portion 71 and the suction port forming portion 60 in the fan axial direction gradually decreases in a direction away from the passage inlet 81. Thus, a loss due to a dynamic change of the gap passage 80 is suppressed and the suction efficiency can be improved.

In addition, in the blower 1, the distance between the filter 20 and the upper end portion 71 in the fan axial direction increases in a direction away from the passage inlet 81 of the gap passage 80. According to this, a pressure loss between the filter 20 and the upper end portion 71 can be suppressed, and the air that has passed through the filter 20 can be efficiently sucked into the tubular portion 72. Therefore, it is possible to improve the air suction efficiency as compared with the conventional one.

Here, the suction port forming portion 60 includes the supporter 65 that supports the upper end portion 71. The upper end portion 71 includes the supported portion 716 supported by the supporter 65. The supported portion 716 has a flat shape in which the angle between the supported portion 716 and the opening surface OS of the suction port 61 is less than an angle between another portion of the upper end portion 71 and the opening surface OS. When the supported portion 716 of the upper end portion 71 is supported by the supporter 65 having a flat shape that defines a small angle with the opening surface OS of the suction port 61, the posture of the upper end portion 71 can be stable.

Second Embodiment

Next, a second embodiment will be described with reference to FIGS. 10 and 11. In this embodiment, the different portions from the first embodiment are mainly described and descriptions of portions similar to the first embodiment will be omitted.

Figure 10:
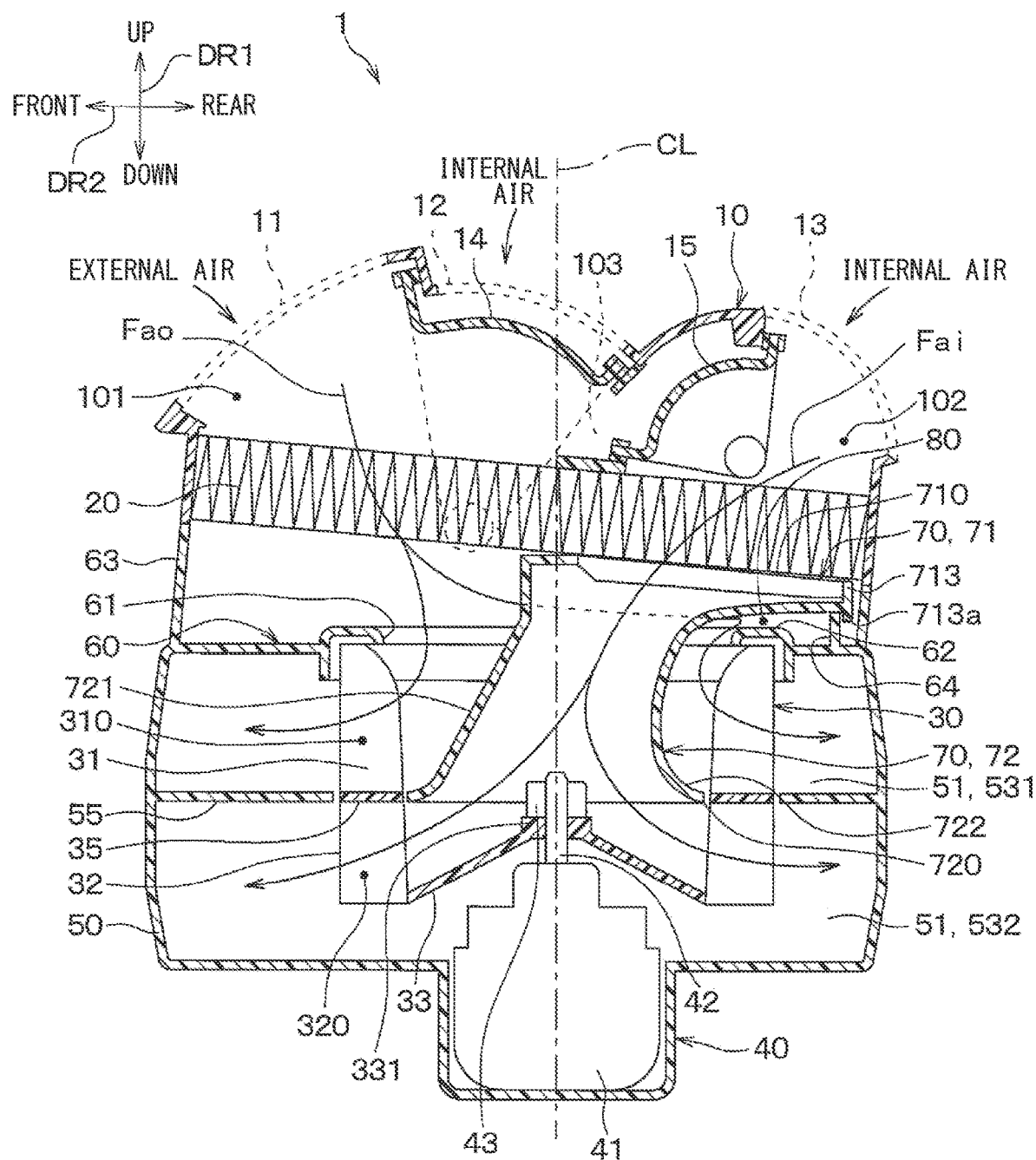
FIG. 10 is a schematic cross-sectional view of a blower according to a second embodiment.

As shown in FIG. 10, in the blower 1, the filter 20 is arranged to be slightly tilted relative to the horizontal direction (that is, the front-rear direction DR2). Specifically, the filter 20 is arranged in a posture in which the front portion of the filter 20 in the front-rear direction DR2 is located above the rear portion of the filter 20 in the front-rear direction DR2.

The separation tube 70 is arranged such that the plate portion 715 of the upper end portion 71 is not tilted relative to the filter 20. That is, the plate portion 715 is substantially parallel to the filter 20. Specifically, the plate portion 715 of the upper end portion 71 is arranged to extend along a surface of the filter 20 through which air flows into and out of the filter 20. The distance between the upper end portion 71 and the filter 20 in the fan axial direction is substantially constant as a whole.

On the other hand, the suction port forming portion 60 is arranged such that the opening surface OS of the suction port 61 is substantially parallel to the horizontal direction, as in the first embodiment. That is, in the blower 1, the suction port forming portion 60 extends in parallel with the horizontal direction.

Figure 11:
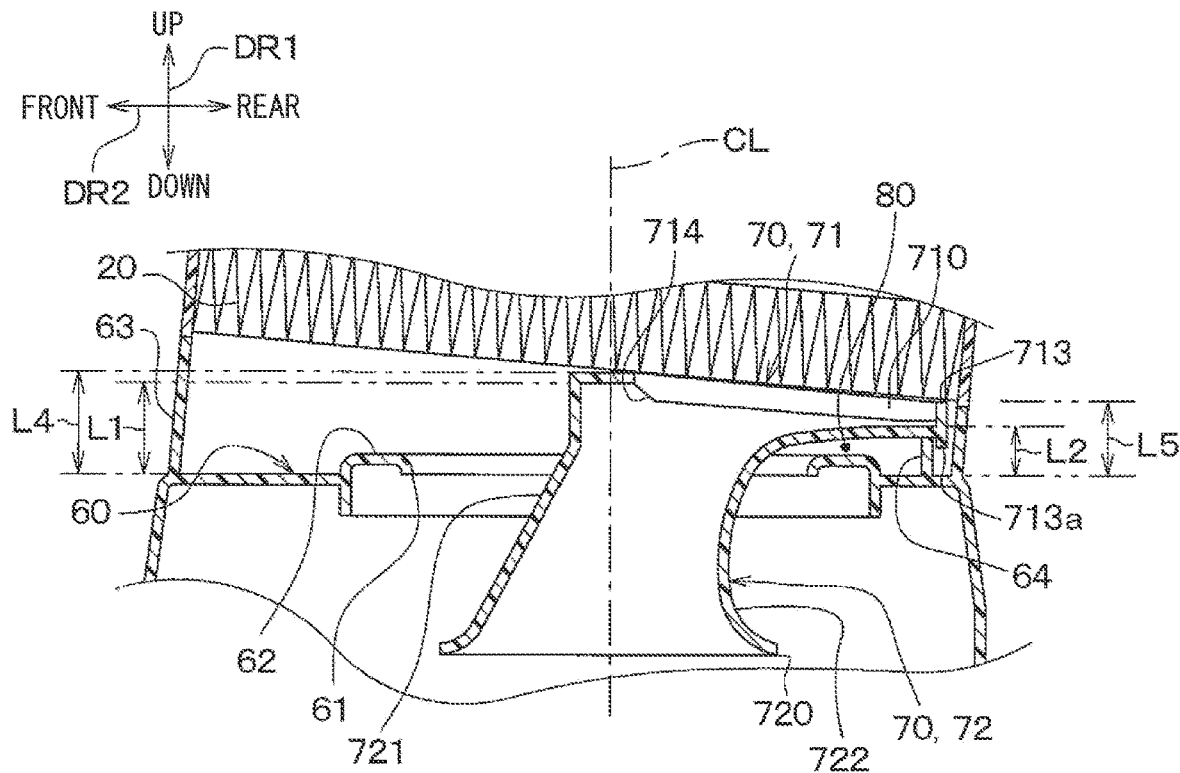
FIG. 11 is a diagram for explaining a relationship between a filter, an upper end portion, and a suction port of the blower according to the second embodiment.

As shown in FIG. 11, in the blower 1, the distance between the opening surface OS of the suction port 61 and the upper end portion 71 decreases in a direction away from the passage inlet 81. That is, the distance L2 between the upper end portion 71 and the suction port forming portion 60 at the edge portion 713 of the upper end portion 71 that faces the outer edge portion 714 is less than the distance L1 between the upper end portion 71 and the suction port forming portion 60 at the outer edge portion 714.

Further, in the blower 1, the distance between the opening surface OS of the suction port 61 and the filter 20 decreases in a direction away from the passage inlet 81. That is, the distance L5 between the filter 20 and the suction port forming portion 60 at the edge portion 713 of the upper end portion 71 that faces the outer edge portion 714 is less than the distance L4 between the filter 20 and the suction port forming portion 60 at the outer edge portion 714.

The other configurations are similar to those of the first embodiment. The blower 1 in the present embodiment can achieve the advantages obtained from the common configuration or the equivalent configuration to the first embodiment.

In the blower 1 of the present embodiment, the distance between the filter 20 and the upper end portion 71 is substantially constant. Therefore, the blower 1 can be configured more compactly than the one in which a part of the distance between the filter 20 and the upper end portion 71 is large.

Modification of Second Embodiment

In the second embodiment, the filter 20 and the upper end portion 71 are arranged to be slightly tilted relative to the horizontal direction, and the suction port forming portion 60 is arranged in substantially parallel to the horizontal direction. However, the present disclosure is not limited to this. The blower 1 may be arranged, for example, such that both of the filter 20 and the upper end portion 71 are substantially parallel to the horizontal direction and the suction port forming portion 60 is slightly tilted relative to the horizontal direction.

Third Embodiment

Next, a third embodiment will be described with reference to FIG. 12. In this embodiment, the different portions from the first embodiment are mainly described and descriptions of portions similar to the first embodiment will be omitted.

Figure 12:
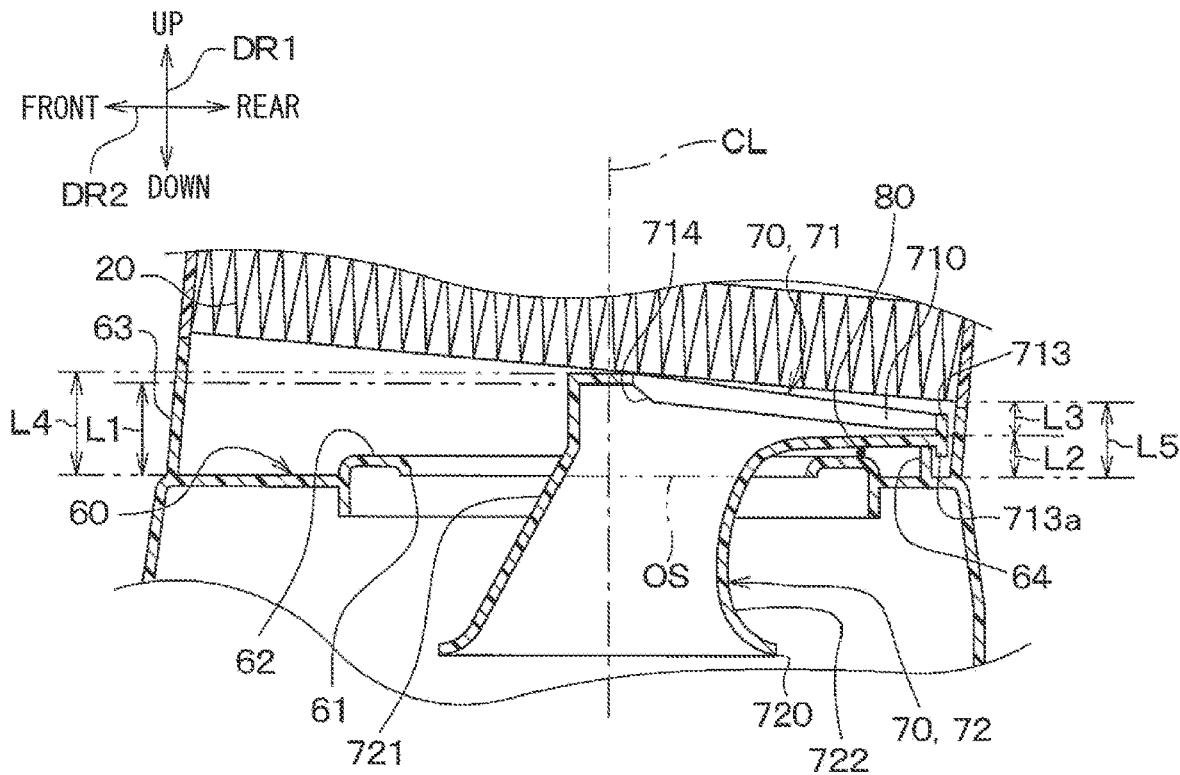
FIG. 12 is a diagram for explaining a relationship between a filter, an upper end portion, and a suction port of a blower according to a third embodiment.

As shown in FIG. 12, in the blower 1, the filter 20 is arranged to be slightly tilted relative to the horizontal direction (i.e., the front-rear direction DR2). Specifically, the filter 20 is arranged in a posture in which the front portion of the filter 20 in the front-rear direction DR2 is located above the rear portion of the filter 20 in the front-rear direction DR2.

In the separation tube 70, the plate portion 715 of the upper end portion 71 is arranged to be tilted relative to the horizontal direction (i.e., the front-rear direction DR2). Specifically, the plate portion 715 of the upper end portion 71 is arranged to be tilted relative to the surfaces of the filter 20 through which air flows in and out.

The distance between the filter 20 and the upper end portion 71 increases in a direction away from the passage inlet 81. That is, the distance L3 between the filter 20 and the upper end portion 71 at the edge portion 713 that faces the outer edge portion 714 is larger than that at the outer edge portion 714.

On the other hand, the suction port forming portion 60 is arranged such that the opening surface OS of the suction port 61 is substantially parallel to the horizontal direction, as in the first embodiment. That is, in the blower 1, the suction port forming portion 60 extends in parallel with the horizontal direction.

In the blower 1, the distance between the opening surface OS of the suction port 61 and the upper end portion 71 decreases in a direction away from the passage inlet 81. That is, the distance L2 between the upper end portion 71 and the suction port forming portion 60 at the edge portion 713 of the upper end portion 71 that faces the outer edge portion 714 is less than the distance L1 between the upper end portion 71 and the suction port forming portion 60 at the outer edge portion 714.

Further, in the blower 1, the distance between the opening surface OS of the suction port 61 and the filter 20 and the distance between the opening surface OS of the suction port 61 and the upper end portion 71 decrease in a direction away from the passage inlet 81. That is, the distance L5 between the filter 20 and the suction port forming portion 60 at the edge portion 713 of the upper end portion 71 that faces the outer edge portion 714 is less than the distance L4 between the filter 20 and the suction port forming portion 60 at the outer edge portion 714.

The other configurations are similar to those of the first embodiment. The blower 1 in the present embodiment can achieve the advantages obtained from the common configuration or the equivalent configuration to the first embodiment.

Modification of Third Embodiment

In the third embodiment, both of the filter 20 and the upper end portion 71 are arranged to be tilted relative to the horizontal direction, and the suction port forming portion 60 is arranged to be substantially parallel to the horizontal direction. However, the present disclosure is not limited to this. The blower 1 may be arranged, for example, such that one of the filter 20 and the upper end portion 71 is arranged to be substantially parallel to the horizontal direction and the suction port forming portion 60 is arranged to be slightly tilted relative to the horizontal direction.

Fourth Embodiment

Next, a fourth embodiment will be described with reference to FIGS. 13 and 14. In this embodiment, the different portions from the first embodiment are mainly described and descriptions of portions similar to the first embodiment will be omitted.

Figure 13:
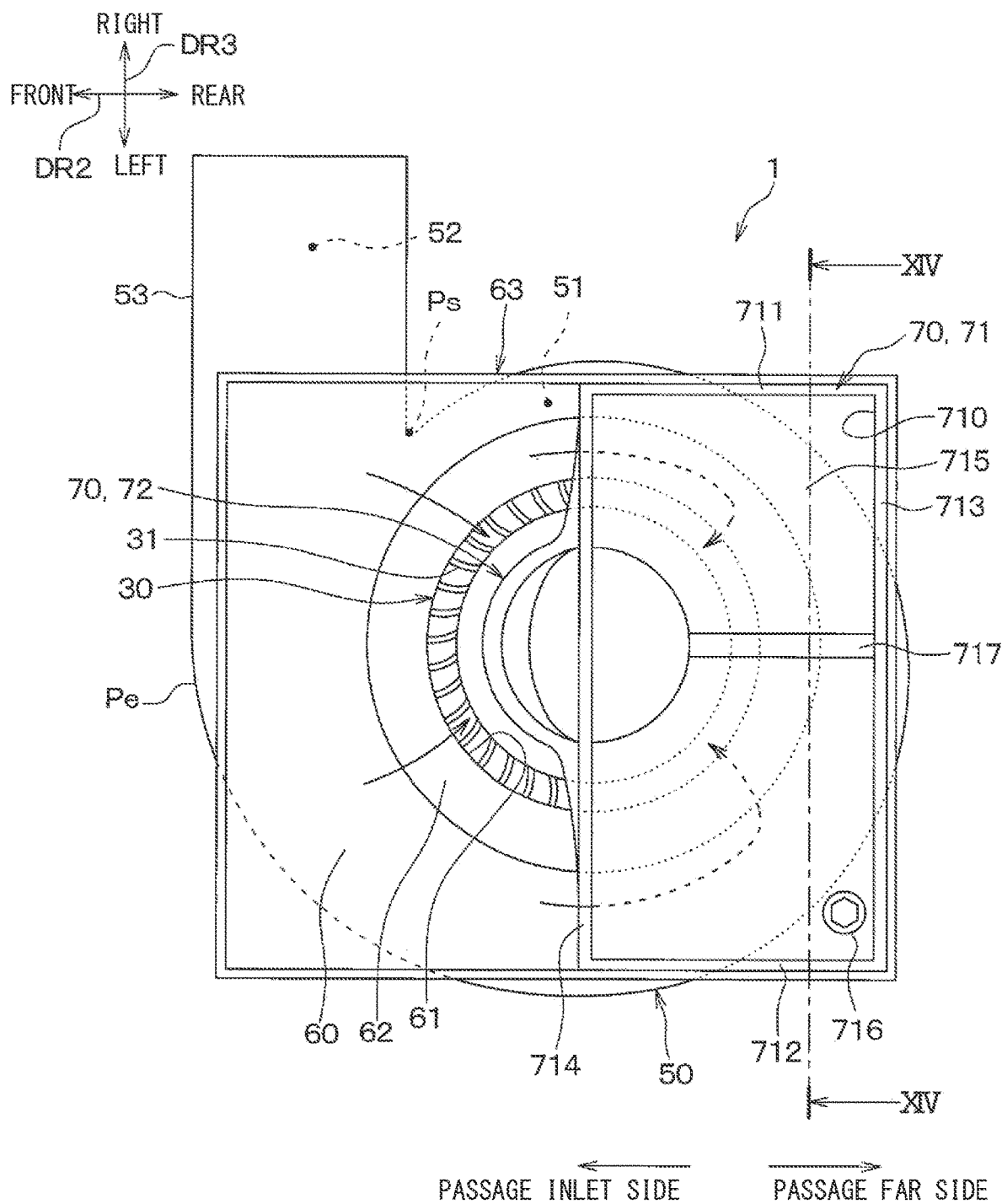
FIG. 13 is a schematic plan view illustrating a part of a blower according to a fourth embodiment.
Figure 14:
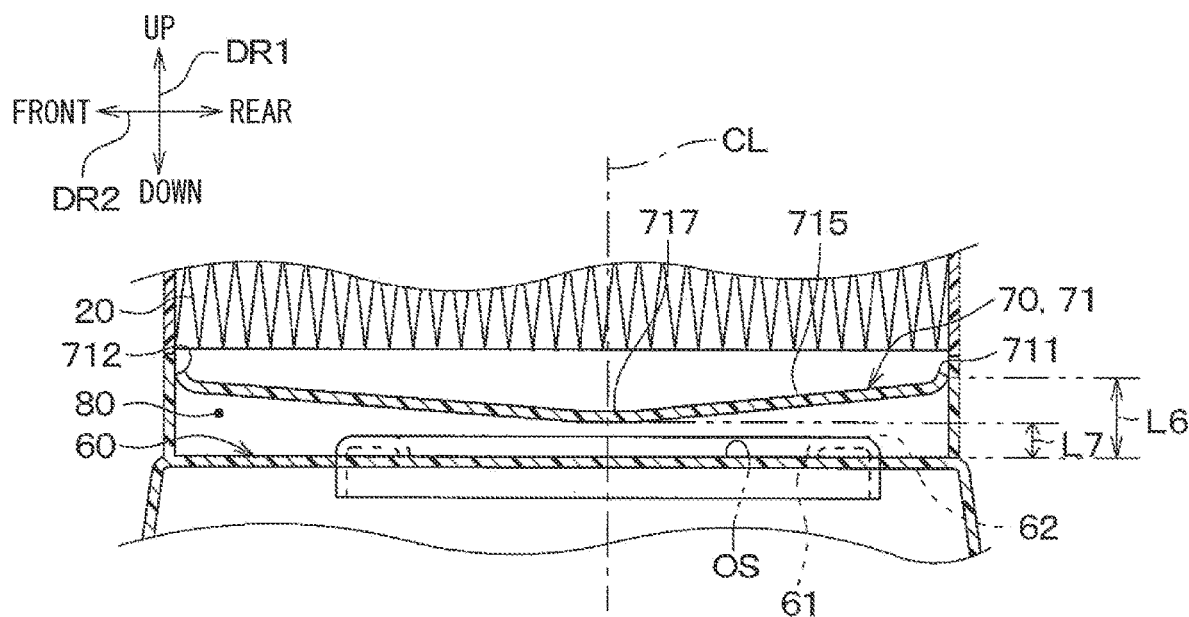
FIG. 14 is a cross-sectional view taken along a line XIV-XIV of FIG. 13.

As shown in FIGS. 13 and 14, in the blower 1, the distance between the upper end portion 71 and the suction port forming portion 60 differs in a direction from one of the edge portions 711, 712 that are connected to the outer edge portion 714 to the other.

Specifically, the plate portion 715 of the upper end portion 71 protrudes downward such that the plate portion 715 is located lower as approaching from the edge portions 711, 712 to an intermediate portion 717 between the edge portions 711, 712. As a result, the distance between the upper end portion 71 and the suction port forming portion 60 becomes smaller from the edge portions 711, 712 toward the intermediate portion 717. That is, the distance L7 between the upper end portion 71 and the suction port forming portion 60 at the intermediate portion 717 is smaller than the distance L6 between the upper end portion 71 and the suction port forming portion 60 at the edge portion 711, 712.

The other configurations are similar to those of the first embodiment. The blower 1 in the present embodiment can achieve the advantages obtained from the common configuration or the equivalent configuration to the first embodiment.

In the blower 1 of the present embodiment, the distance between the upper end portion 71 and the suction port forming portion 60 becomes smaller in a direction from the edge portion 711, 712 to the intermediate portion 717 between the edge portions 711, 712. According to this, the air flowing through the gap passage 80 is easily guided toward the suction port 61 by the upper end portion 71, and the air flowing into the gap passage 80 is easily sucked into the suction port 61 efficiently. Therefore, it is possible to improve the air suction efficiency as compared with the conventional one.

Modification of Fourth Embodiment

In the fourth embodiment, the distance between the upper end portion 71 and the suction port forming portion 60 decreases toward the intermediate portion 717 between the edge portions 711 and 712 from the edge portions 711 and 712. However, the present disclosure is not limited to this. In the blower 1, the plate portion 715 may be tilted near the edge portions 711, 712 and may be flat near the intermediate portion 717.

Fifth Embodiment

Next, a fifth embodiment will be described with reference to FIG. 15. In this embodiment, the different portions from the first embodiment are mainly described and descriptions of portions similar to the first embodiment will be omitted.

Figure 15:
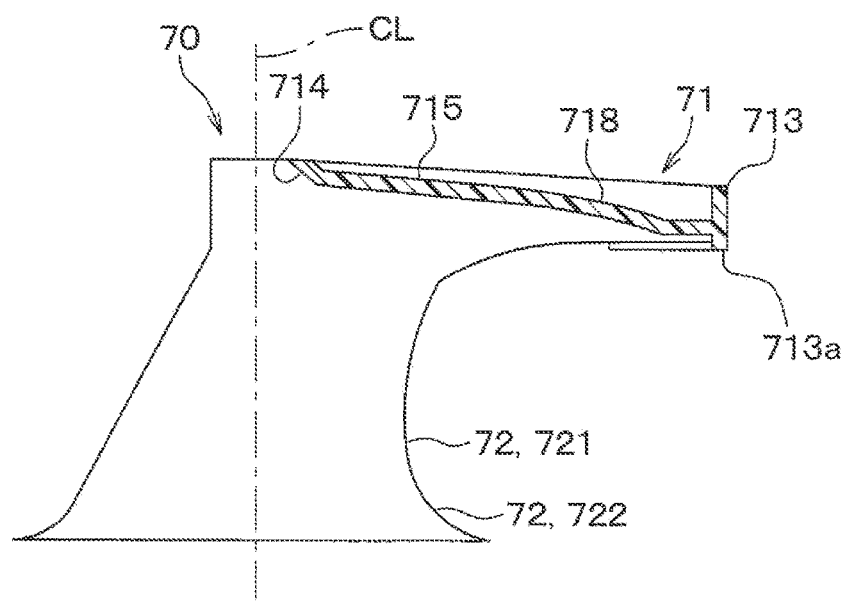
FIG. 15 is a schematic cross-sectional view of a separation tube of a blower according to a fifth embodiment.

As shown in FIG. 15, the upper end portion 71 includes a curved portion 718 that curvedly extends in addition to the plate portion 715 that is a tilted flat member. Specifically, a portion of the upper end portion 71 near the outer edge portion 714 is the plate portion 715 and a portion of the upper end portion 71 near the edge portion 713 that faces the outer edge portion 714 is the curved portion 718.

The curved portion 718 curves such that an angle between the curved portion 718 and the suction port forming portion 60 increases from the outer edge portion 714 toward the edge portion 713. In other words, the curved portion 718 curves such that a decrease rate of the distance between the curved portion 718 and the suction port forming portion 60 increases from the outer edge portion 714 toward the edge portion 713.

The other configurations are similar to those of the first embodiment. The blower 1 in the present embodiment can achieve the advantages obtained from the common configuration or the equivalent configuration to the first embodiment.

Modification of Fifth Embodiment

The upper end portion 71 of the fifth embodiment includes the plate portion 715 that is flatly tilted. However, the present disclosure is not limited to this. The upper end portion 71 may be curvedly tilted as a whole. Further, a portion of the upper end portion 71 near the outer edge portion 714 may be the curved portion 718 and a portion of the upper end portion 71 near the edge portion 713 that faces the outer edge portion 714 may be the plate portion 715. Further, the curved portion 718 may curve such that an angle between the curved portion 718 and the suction port forming portion 60 decreases from the outer edge portion 714 toward the edge portion 713. The upper end portion 71 may have a stepped shape such that a passage area of the gap passage 80 decreases from the passage inlet 81 of the gap passage 80 toward the downstream portion of the gap passage 80.

Other Embodiments

Although the representative embodiments of the present disclosure have been described above, the present disclosure is not limited to the embodiments and can be variously modified as follows, for example.

In the above-described embodiments, the filter 20 is arranged between the internal-external air box 10 and the suction port forming portion 60, but the blower 1 is not limited to this. In the blower 1, for example, the filter 20 may be arranged inside the internal-external air box 10, or the filter 20 may be omitted.

In the above-described embodiments, the supported portion 716 of the upper end portion 71 that has a flat shape is supported by the supporter 65 of the suction port forming portion 60. However, the blower 1 is not limited to this. The blower 1 may have a support structure in which the plate portion 715 of the upper end portion 71 is supported by the supporter 65. Further, the upper end portion 71 may be supported by the attachment frame 63 instead of the suction port forming portion 60, for example.

In the above-described embodiments, the blower 1 is applied to an internal-external air two layers air conditioner for a vehicle that can blow external air and internal air separately. However, the blower 1 may be applied to another device other than the air conditioner.

In the above embodiments, it goes without saying that the components constituting the embodiments are not necessarily indispensable unless otherwise clearly stated or unless otherwise thought to be clearly indispensable in principle.

In the above embodiments, when a numerical value such as the number, a numerical value, an amount, or a range of the component of the embodiment is mentioned, the numerical value is not limited to the specified number unless otherwise specified to be indispensable or clearly limited to the specified number in principle.

In the above embodiments, when a shape, a positional relationship, or the like of the component or the like is mentioned, the shape, the positional relationship, or the like is not limited to that being mentioned unless otherwise specified or limited to a specified shape, a specified positional relationship, or the like in principle.

(Overview)

According to the first aspect shown in a part or all of the above embodiments, the separation tube of the blower includes a tubular portion configured to introduce the first fluid and the second fluid separately into the fan and an upper end portion defining an air inlet for introducing at least one of the first fluid or the second fluid into the tubular portion. The upper end portion is disposed at a position between the suction port forming portion and the fluid introducing box to overlap with both of a part of the suction port and a part of the suction port forming portion in the axial direction. A gap passage is defined between the upper end portion and the suction port forming portion and the gap passage includes a passage inlet. At least one of the first fluid or the second fluid is introduced into the gap passage from the passage inlet and fluids through the gap passage toward a downstream portion of the gap passage that is away from the passage inlet. A distance between the upper end portion and the suction port forming portion in the axial direction at the downstream portion is less than that at the passage inlet.

According to the second aspect, the upper end portion includes a plate portion facing the suction port forming portion and the plate portion has a thickness in the axial direction. The plate surface of the plate portion is tilted relative to an opening surface of the suction port.

According to this, the distance between the upper end portion and the suction port forming portion in the axial direction is decreased in a direction away from the passage inlet of the gap passage. Thus, a loss due to a dynamic change of the gap passage can be avoided and suction efficiency of the blower can be improved. In the present disclosure, "the opening surface" means a virtual surface surrounded and defined by the edge of the suction port.

According to the third aspect, a filter for filtering the first fluid and the second fluid introduced from the fluid introducing box is arranged between the fluid introducing box and the upper end portion. The distance between the filter and the upper end portion in the axial direction increases in a direction away from the passage inlet.

In this way, when the distance between the filter and the upper end portion increases in a direction away from the passage inlet, a pressure loss between the filter and the upper end portion can be suppressed and the air passing through the filter can be drawn into the tubular portion more efficiently. Therefore, the suction efficiency of the blower can be improved.

According to the fourth aspect, a filter for filtering the first fluid and the second fluid introduced from the fluid introducing box is arranged between the fluid introducing box and the upper end portion. The distance between the suction port forming portion and the filter in the axial direction at the downstream portion is smaller than that at the passage inlet. This also improves the air suction efficiency of the blower.

According to the fifth aspect, a filter for filtering the first fluid and the second fluid introduced from the fluid introducing box is arranged between the fluid introducing box and the upper end portion. The distance between the filter and the upper end portion in the axial direction increases in a direction away from the passage inlet. The distance between the suction port forming portion and the filter in the axial direction at the downstream portion is smaller than that at the passage inlet. This also improves the air suction efficiency of the blower.

According to the sixth aspect, the suction port forming portion includes a supporter supporting the upper end portion. The upper end portion includes a supported portion supported by the supporter. The supported portion has a flat shape such that an angle between the supported portion and an opening surface of the suction port is less than an angle between the opening surface and another portion of the upper end portion other than the supported portion. As described above, when the supporter having a flat shape that defines a small angle with the opening surface of the suction port supports the supported portion, the posture of the upper end portion can be stable.

What is claimed is:

1. A blower configured to suck a first fluid and a second fluid separately at a same time, the blower comprising:
   a fluid introducing box defining a first inlet through which the first fluid is introduced and a second inlet through which the second fluid is introduced;
   a fan configured to suck at least one of the first fluid or the second fluid in an axial direction of the fan and blow the at least one of the first fluid or the second fluid in a radial direction of the fan by rotating about a fan axis;
   a casing housing the fan;
   a tubular portion having a part disposed inside the fan and configured to introduce the first fluid and the second fluid separately into the fan; and
   an upper end portion connected to one end of the tubular portion in the axial direction and defining an air inlet for introducing at least one of the first fluid or the second fluid into the tubular portion, wherein
   the casing has a suction port forming portion at one end of the casing in the axial direction, the suction port forming portion defining a suction port for introducing at least one of the first fluid or the second fluid into the fan,
   the upper end portion is disposed at a position between the suction port forming portion and the fluid introducing box to overlap with both of a part of the suction port and a part of the suction port forming portion in the axial direction,
   a gap passage is defined between the upper end portion and the suction port forming portion and the gap passage includes a passage inlet,
   at least one of the first fluid or the second fluid is introduced into the gap passage from the passage inlet and fluids through the gap passage toward a downstream portion of the gap passage that is away from the passage inlet, and
   a distance between the upper end portion and the suction port forming portion in the axial direction at the downstream portion is less than that at the passage inlet.

2. The blower according to claim 1, wherein
   the upper end portion includes a plate portion facing the suction port forming portion, the plate portion having a thickness in the axial direction, and
   a plate surface of the plate portion is tilted relative to an opening surface of the suction port.

3. The blower according to claim 1, further comprising
a filter disposed between the fluid introducing box and the upper end portion to filter the first fluid and the second fluid introduced from the fluid introducing box, wherein
a distance between the filter and the upper end portion in the axial direction increases in a direction away from the passage inlet.

4. The blower according to claim 1, further comprising
a filter disposed between the fluid introducing box and the upper end portion to filter the first fluid or the second fluid introduced from the fluid introducing box, wherein
a distance between the suction port forming portion and the filter in the axial direction at the downstream portion is less than that at the passage inlet.

5. The blower according to claim 1, further comprising
a filter disposed between the fluid introducing box and the upper end portion to filter the first fluid and the second fluid introduced from the fluid introducing box, wherein
a distance between the filter and the upper end portion in the axial direction increases in a direction away from the passage inlet, and
a distance between the suction port forming portion and the filter in the axial direction at the downstream portion is less than that at the passage inlet.

6. The blower according to claim 1, wherein
the suction port forming portion includes a supporter supporting the upper end portion,
the upper end portion includes a supported portion supported by the supporter, and
the supported portion has a flat shape such that an angle between the supported portion and an opening surface of the suction port is less than an angle between the opening surface and another portion of the upper end portion other than the supported portion.

* * * * *